(12) United States Patent
Salazar

(10) Patent No.: US 10,160,510 B1
(45) Date of Patent: Dec. 25, 2018

(54) HEIGHT AND TILT ADJUSTABLE HANDLEBAR AND STEM ASSEMBLY

(71) Applicant: Nicholas M Salazar, Parker, CO (US)

(72) Inventor: Nicholas M Salazar, Parker, CO (US)

( * ) Notice: Subject to any disclaimer, the term of this patent is extended or adjusted under 35 U.S.C. 154(b) by 6 days.

(21) Appl. No.: 15/708,409

(22) Filed: Sep. 19, 2017

(51) Int. Cl.
*B62K 21/12* (2006.01)
*B62K 21/16* (2006.01)
*B62K 21/14* (2006.01)

(52) U.S. Cl.
CPC ............ *B62K 21/125* (2013.01); *B62K 21/12* (2013.01); *B62K 21/14* (2013.01); *B62K 21/16* (2013.01)

(58) Field of Classification Search
CPC ....... B62K 21/125; B62K 21/12; B62K 21/16
See application file for complete search history.

(56) References Cited

U.S. PATENT DOCUMENTS

| | | | | |
|---|---|---|---|---|
| 7,213,485 B2 * | 5/2007 | Huang | ................. | B62K 21/125 74/551.1 |
| 7,837,212 B2 * | 11/2010 | D'Aluisio | ................. | B60T 7/10 280/279 |
| 8,172,247 B2 * | 5/2012 | Weber | ................. | B62K 21/125 280/278 |
| 8,408,574 B2 * | 4/2013 | Callahan | ................. | B62K 21/16 280/274 |
| 9,415,825 B1 * | 8/2016 | Salazar | ................. | B62K 21/18 |
| 2007/0039409 A1 * | 2/2007 | Meng | ................. | B62K 21/12 74/551.8 |
| 2010/0199801 A1 * | 8/2010 | Huang | ................. | B62K 21/12 74/551.3 |
| 2012/0079910 A1 * | 4/2012 | Wehage | ................. | B62K 21/12 74/551.1 |
| 2017/0008598 A1 * | 1/2017 | Brown | ................. | B62K 21/16 |

FOREIGN PATENT DOCUMENTS

EP         1652764 A1  *  5/2006 ............. B62K 21/12

* cited by examiner

*Primary Examiner* — Luis A Gonzalez

(74) *Attorney, Agent, or Firm* — Leyendecker & Lemire, LLC

(57) ABSTRACT

A combination triathlon aero handlebar and stem assembly or handlebar assembly is described that permits the adjustment of the height and tilt of the elbow platform and the associated left and right tubular hand extensions relative to a main body thereof.

20 Claims, 14 Drawing Sheets

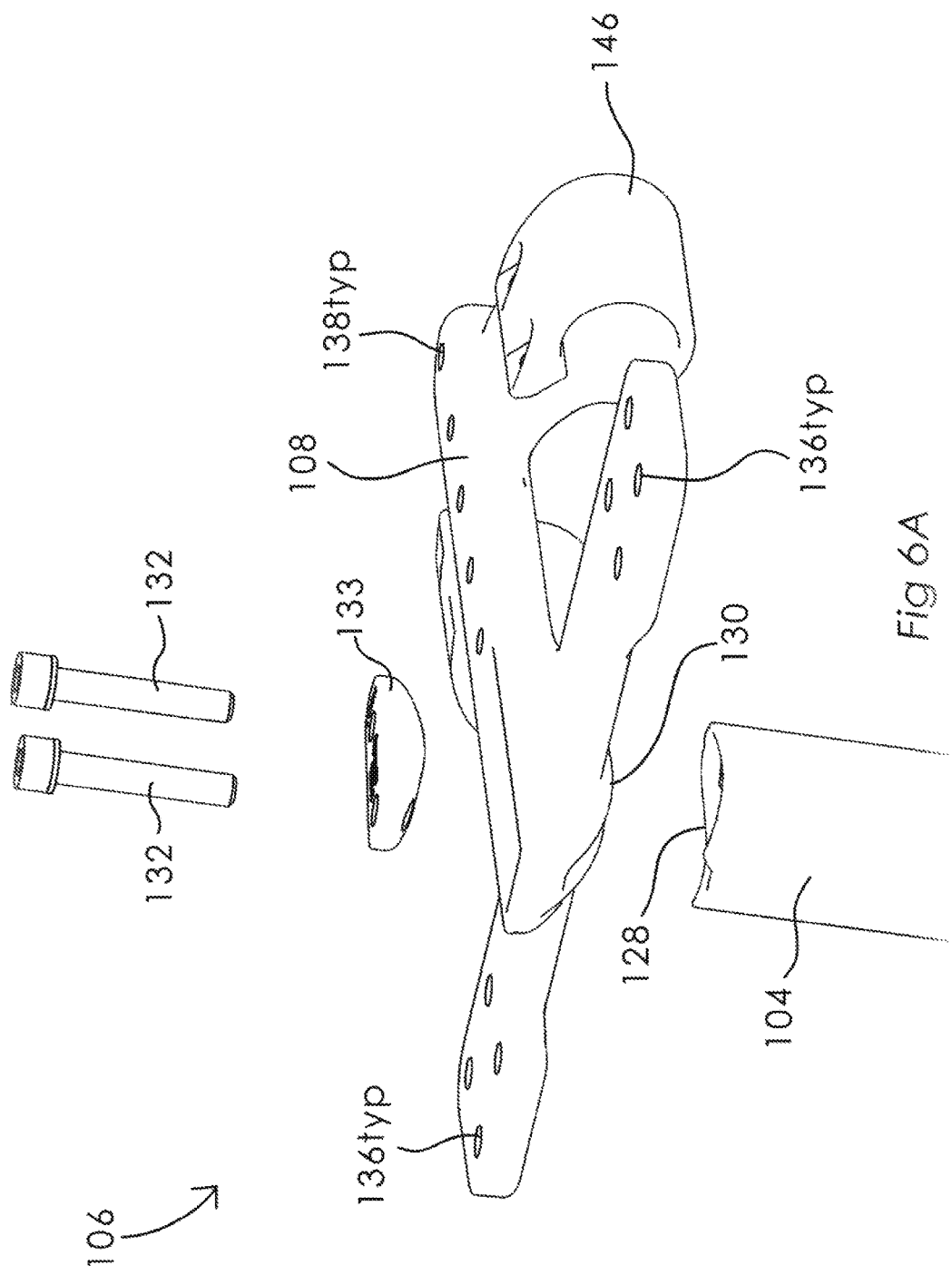

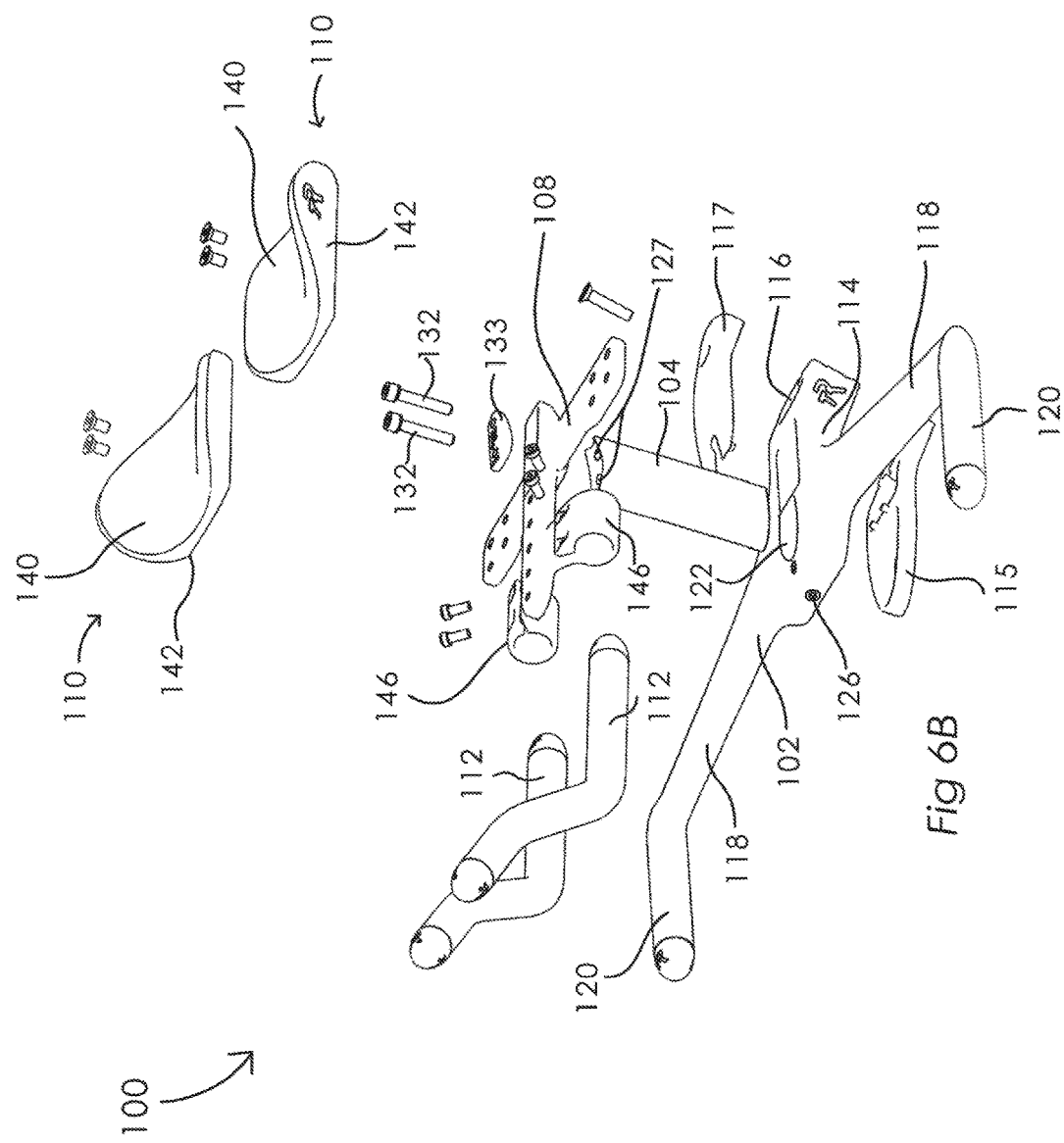

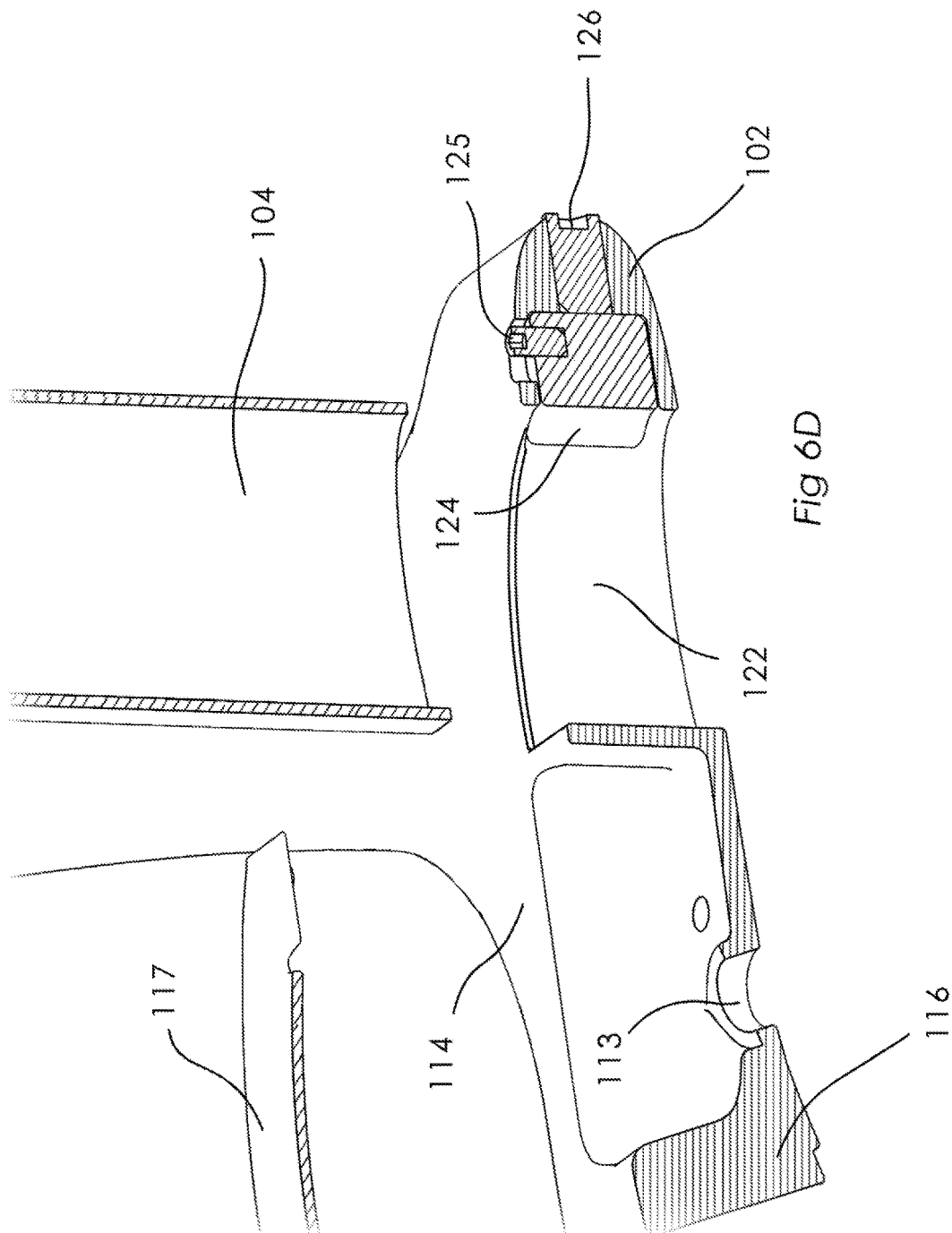

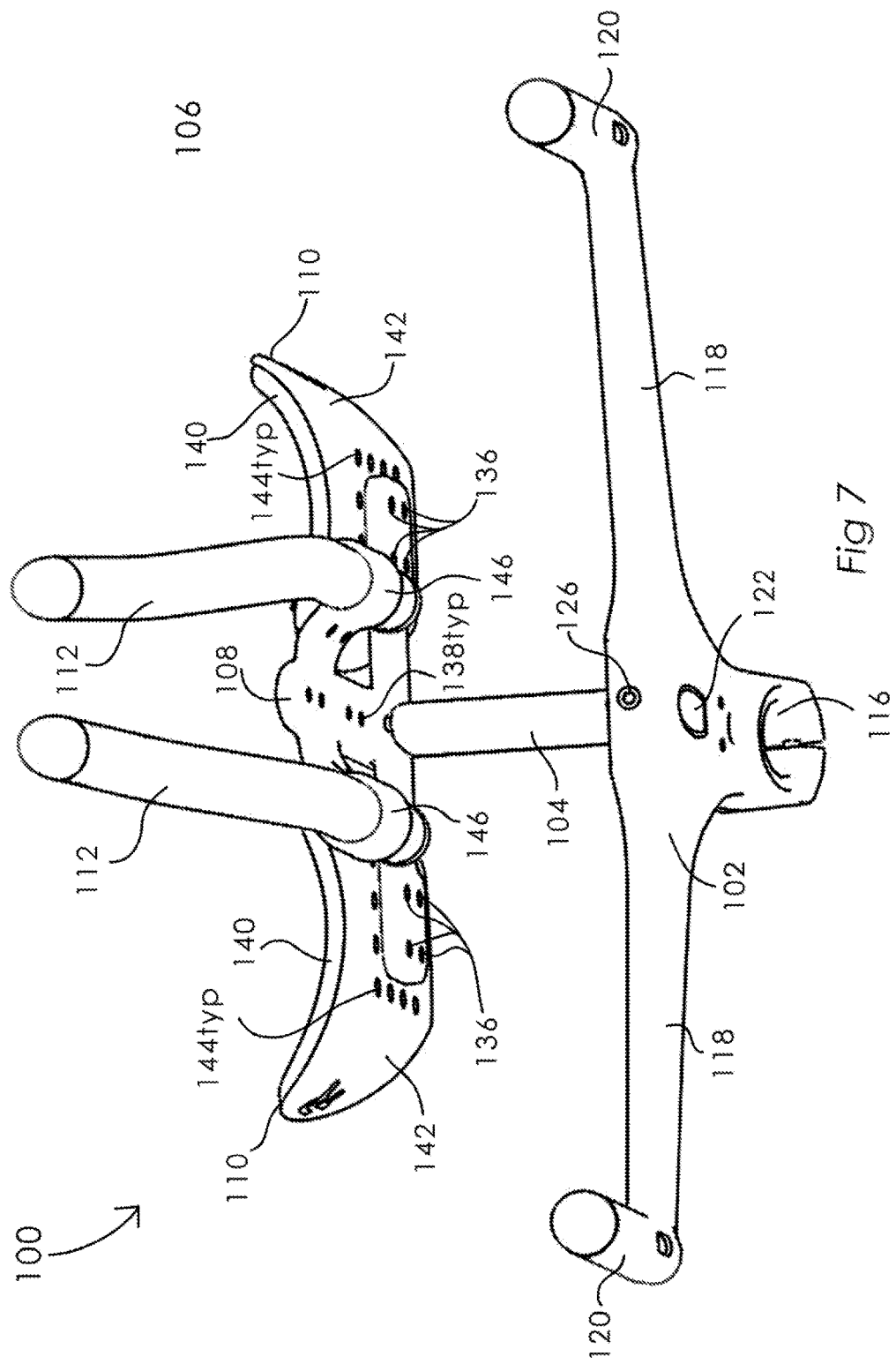

HEIGHT AND TILT ADJUSTABLE HANDLEBAR AND STEM ASSEMBLY

BACKGROUND

Combination triathlon aero handlebar and stem assemblies (referred to herein as "handlebar assemblies") are known and typically comprise a unitary main body, often advantageously fabricated from a carbon fiber composite, and including a stem portion, right and left aerofoil portions extending outwardly of the stem and left and right handle portions situated at the ends of the respective aerofoil portions. A pair of relatively closely spaced tubular extensions extends forwardly from the body on either side of the stem portion. The extensions are mounted to the body by way of an extension mount assembly that includes a circular clamp to secure the extensions in place. The extension mount assembly also typically includes elongated fasteners and vertical extension spacers through which the entire assembly is secured to the body with the circular clamp located a desired distance above the body. On top of the extension mount assembly, an elbow rest platform is provided that is typically secured to the extension mount assembly through fasteners. Resilient cushioned pads may be provided to rest on the top of the elbow platform.

The stem portion mounts to a portion of an associated bicycle's fork steerer tube that extends upwardly from the frame of the bike to which it is rotatably secured. Stem height spacers are used between a bicycle head tube and the bottom of the stem portion to set the height of the rest of the handlebar assembly. To change the relative height of the handlebar assembly, the rider must remove the assembly from the steerer tube and add or subtract spacers.

In at least some assemblies the height of the tubular inner extensions and the associated elbow rest platforms above the stem, associated aerofoil portions and left and right handle portions can be adjusted through the use of spacers as well, such as is described in U.S. Pat. No. 9,415,825 entitled Combination Bicycle Handlebar and Stem Assembly, which utilizes a left and right spacer columns to adjust elbow rest platform height. U.S. Pat. No. 9,415,825 is incorporated herein in its entirety. While a significant improvement over assemblies herein the height is not adjustable, changing the height can be time consuming and due to the use of spacers of finite height, the height of the stack is not from a practical standpoint infinitely adjustable.

BRIEF DESCRIPTION OF THE DRAWINGS

FIG. 6A-D are isometric exploded views of the handlebar and stem assembly including a partial cross sectional view of the main body according to one embodiment of the present invention.

FIG. 7 is an isometric bottom front view of the handlebar and stem assembly according to one embodiment of the present invention.

DETAILED DESCRIPTION

Figure 1:
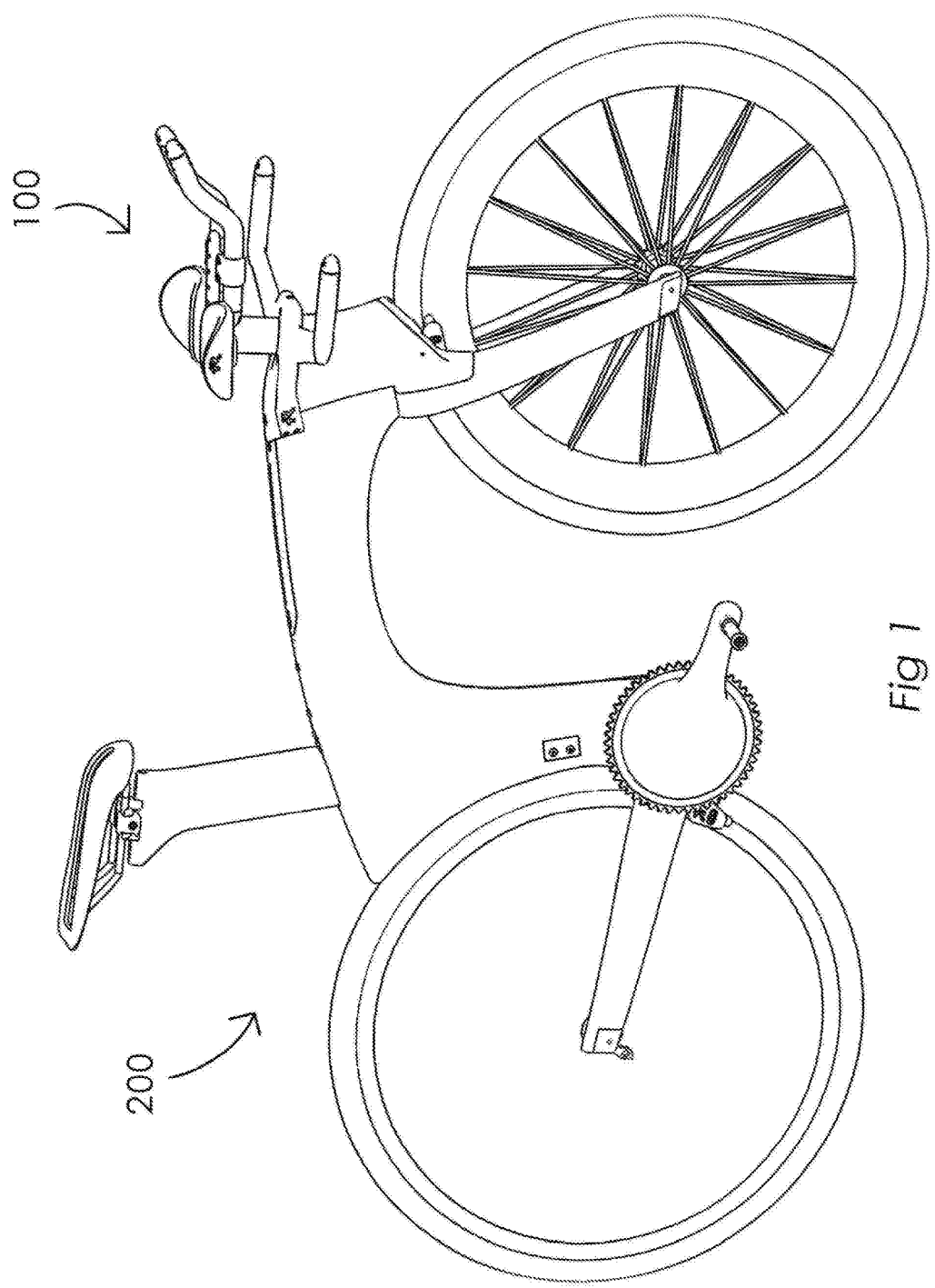
FIG. 1 is an isometric view of a bicycle including a handlebar and stem assembly with height and tilt adjustments according to one embodiment of the present invention.

At least one embodiment of the present invention comprises a combination triathlon aero handlebar and stem assembly or handlebar assembly incorporating one or more improvements including improvements pertaining to height and tilt adjustments of the elbow platform and the associated left and right tubular hand extensions.

Embodiments of the handlebar assembly include a generally vertically-orientated, aerodynamically-shaped extension shaft, which the elbow platform assembly is attached at a top end, that is slidably received in a correspondingly-shaped opening in the main body of the integral stem and handlebar. The extension shaft is securable by way of a wedge clamp actuated from a single cap screw typically from the front of the main body. This configuration facilitates infinite height adjustment of the shaft along its length allowing a user to place the height of the elbow rest assembly wherever he/she desires.

In at least some embodiments, the elbow rest assembly's elbow platform is also adjustably mounted to the top end of the extension shaft permitting the fore and aft tilt of the elbow assembly relative to the underlying main stem/handlebar body. In at least one variation the tilt adjustment is made by way of a pair of cap screws accessible from the top side of the elbow platform.

Collectively, the ability to infinitely adjust the height of the elbow platform and set its tilt angle relative to the underlying main body of the handlebar assembly permit a rider to easily and quickly adjust the cockpit of a time trial or triathlon bike wherein the assembly is most typically used to positions that maximize his/her position on the bike for maximum efficiency.

Embodiments of the handlebar assembly offer additional advantages over many prior art handlebars and handlebar/stem assemblies including the ability to adjust the width of the elbow pads as well as the fore and aft as well as rotational positions of the left and right extension tubes are adjustable relative to the elbow platform in at least some embodiments.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The terms "streamlined", "aerodynamic" and "aerofoil" as used herein refer to the general shape of the components/elements to which they refer. They reference a general shape that is designed or configured to move smoothly through the air and cause reduced drag over similar components/elements that are not so shaped.

An Embodiment of a Handlebar Assembly

FIG. 1 illustrates an embodiment of the handlebar assembly 100 mounted on a bicycle 200. FIGS. 2-11 illustrate an embodiment of the handlebar assembly and components thereof. The primary components and subassemblies of the handlebar assembly include (i) a unitary main body 102 (or body member), (ii) the aerodynamically-shaped extension shaft 104, and (iii) an elbow rest subassembly 106 including an elbow rest platform 108, left and right elbow pads 110 and left and right extension rods 112. Additional components include but are not limited to covers, spacers, fasteners, and hole plugs.

Figure 6C:
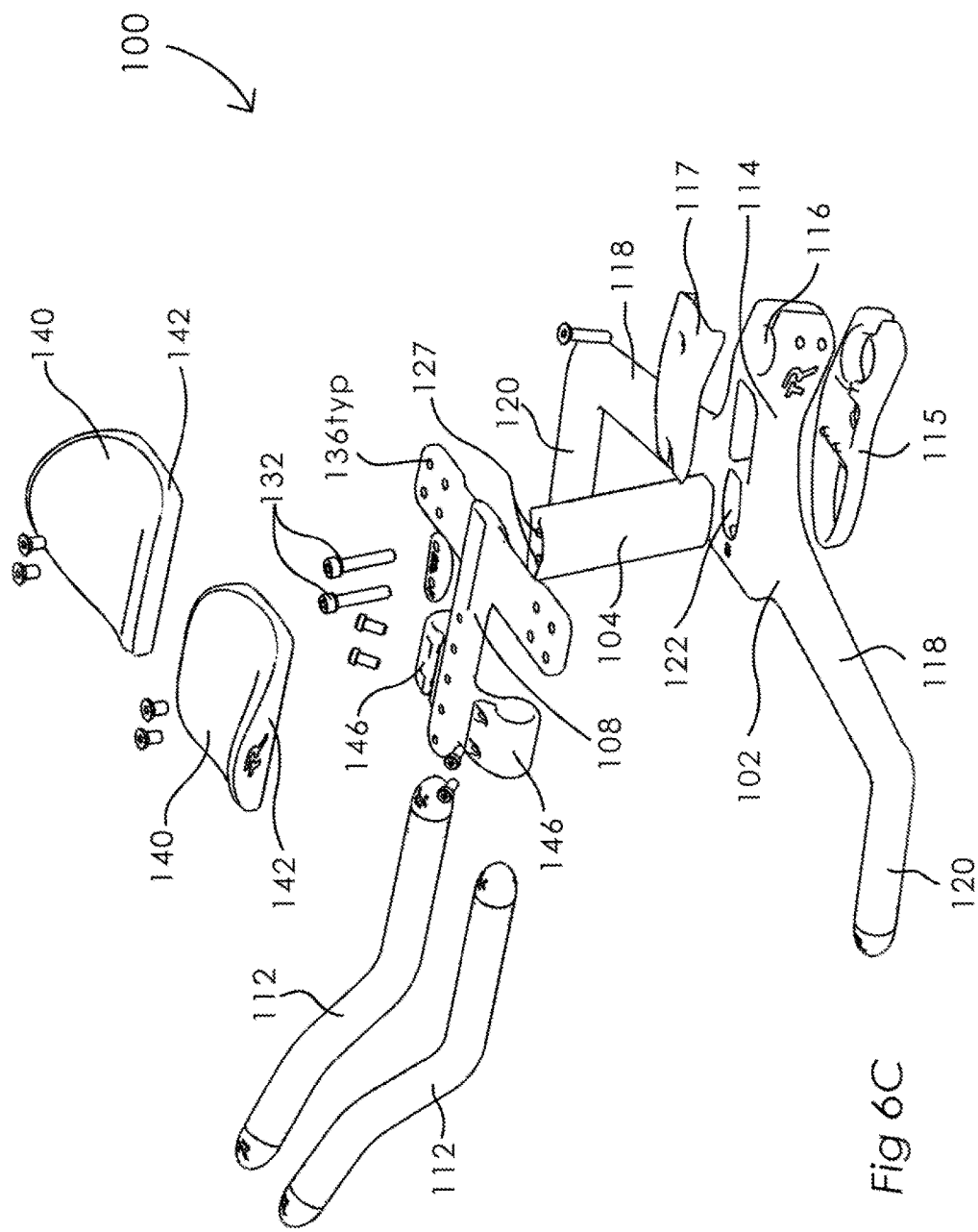
Figure 8:
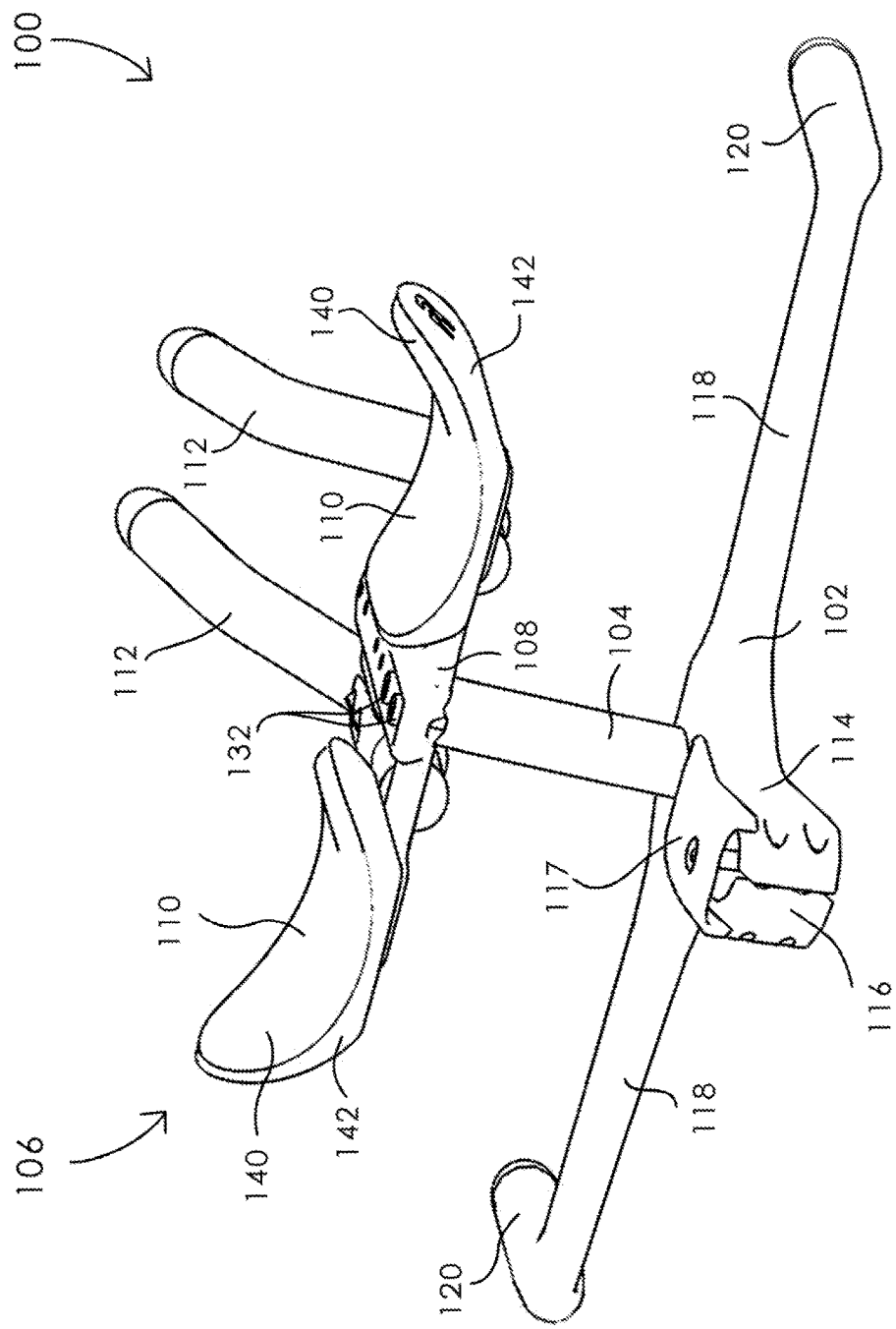
FIG. 8 is an isometric rear view of the handlebar and stem assembly according to one embodiment of the present invention.

The unitary main body 102 is shown individually in the exploded view of FIGS. 6B-C. It is typically fabricated of a unitarily molded carbon fiber and resin composite and comprises several distinct portions. A stem portion 114 extends from a steerer tube bore/clamp 116 wherein the steerer tube of a bicycle's fork is received and secured. From the left and right sides of the stem portion integrally molded respective left and right portions 118 that typically have an aerofoil shape extend outwardly terminating in integrally molded respective left and right handholds 120. The interior of the body portion is substantially hollow with access holes placed in the body at strategic locations permitting cables and wires associated with shifters and/or brake actuators to be routed therein. As shown, one or more spacers 115 can be provided on the bottom side of the stem portion and a stem cover 117 can be provided on the top side thereof.

Figure 2:
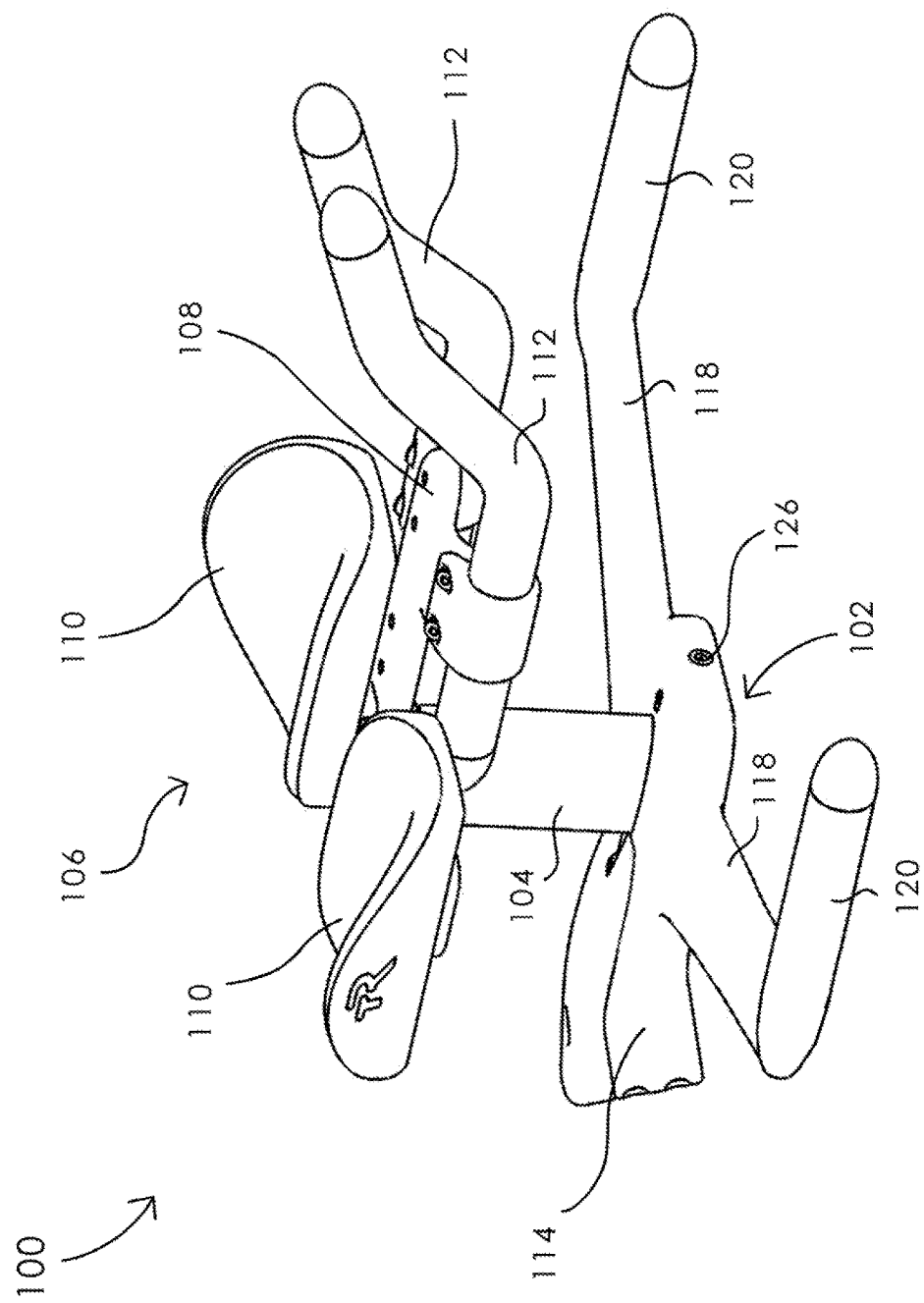
FIG. 2 is an isometric front view of the handlebar and stem assembly according to one embodiment of the present invention.
Figure 3:
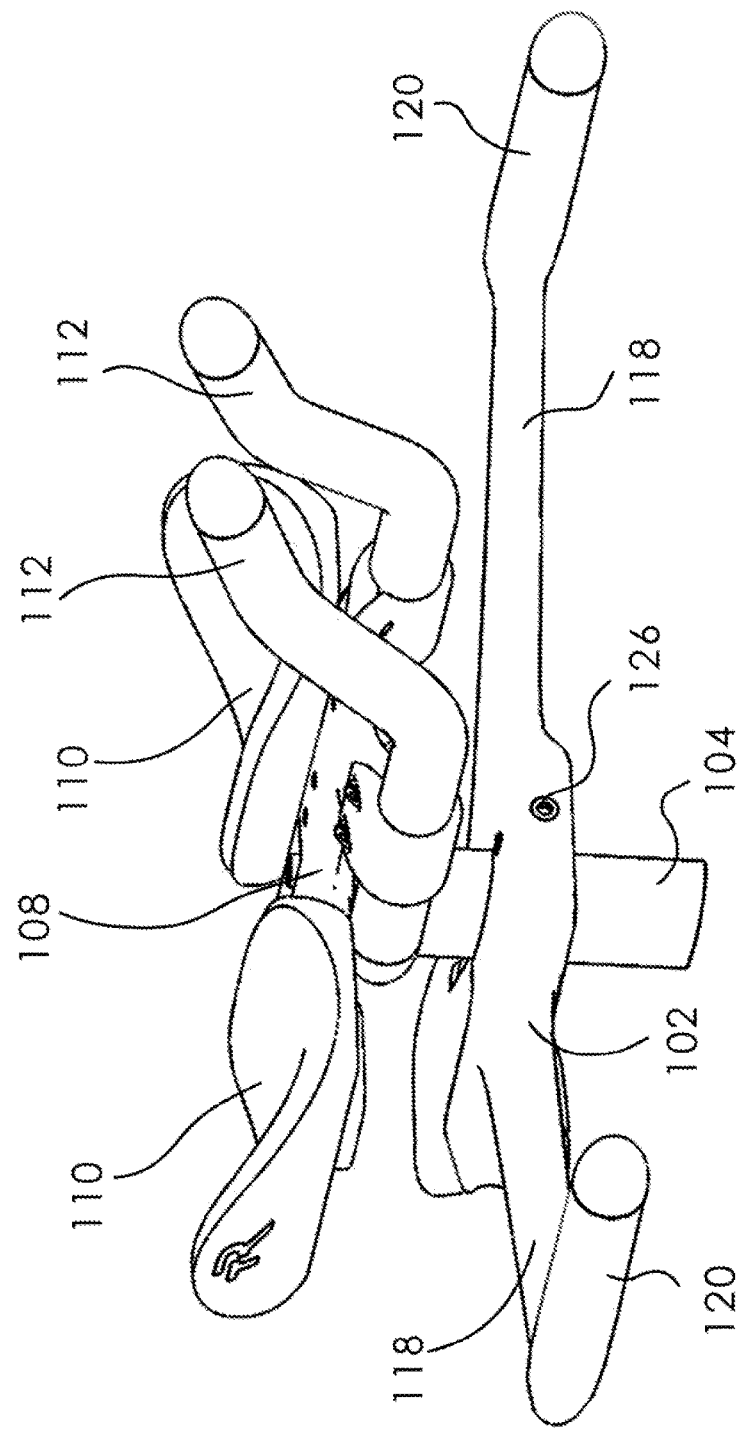
FIG. 3 is another isometric front view of the handlebar and stem assembly with the elbow platform lowered according to one embodiment of the present invention
Figure 4:
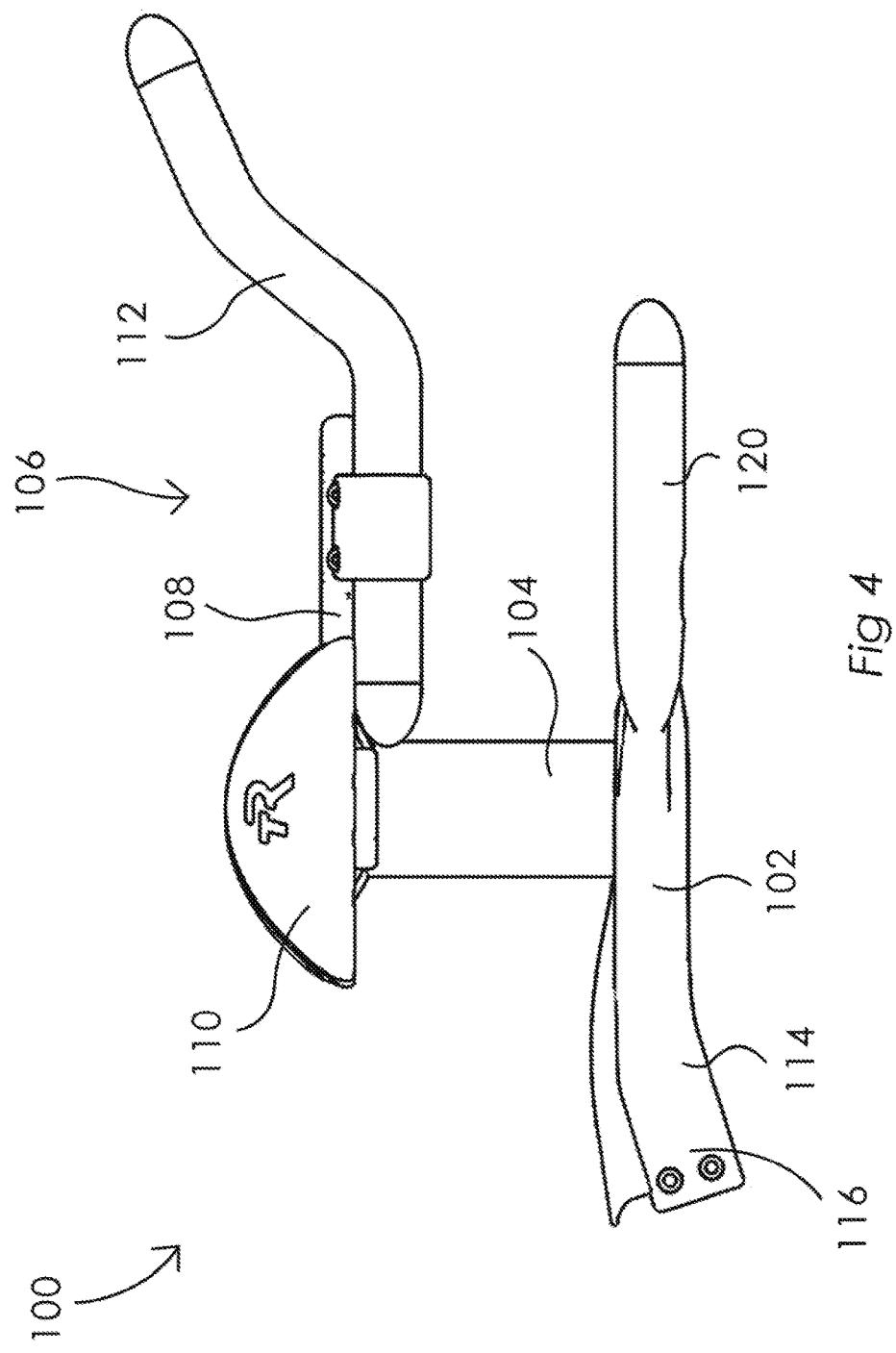
FIG. 4 is a side view of the handlebar and stem assembly according to one embodiment of the present invention.
Figure 5:
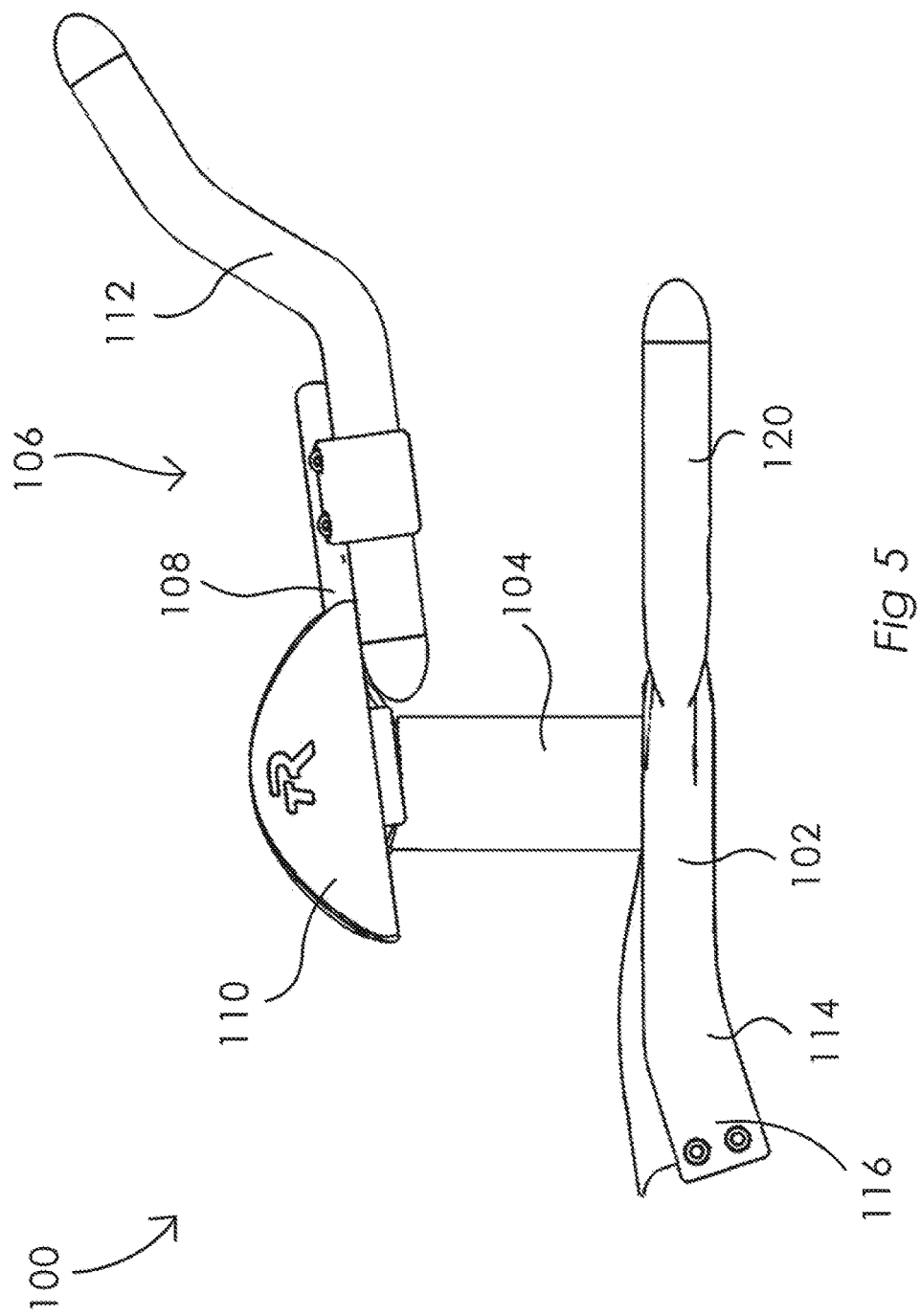
FIG. 5 is a side view of the handlebar and stem assembly with the elbow platform tilted according to one embodiment of the present invention.

As can be seen in FIGS. 6B-D, an airfoil-shaped shaft opening 122 is provided through the left/right center of the main body 102 proximate the fore and aft location where the left and right portions 118 extend outwardly. At a front end of the opening with primary reference to FIG. 6D, a correspondingly shaped wedge 124 is provided that is configured to be pushed into the opening by a grub screw 126 when the grub screw is tightened. A set screw 125 can also be provided that prevents the wedge from falling out of the body when the extension shaft is removed from the shaft opening 122. The shaft opening is configured to slidably receive the aerodynamically-shaped (or aerofoil) extension shaft 104 therethrough. By tightening the grub screw, which is typically accessed at the front face of the body, a user can secure the post in place at a desired height. FIG. 2 illustrates the extension shaft fully extended and FIG. 3 illustrates the extension shaft in an almost fully lowered position. It is to be appreciated that the positioning of the extension shaft is infinitely variable or adjustable within along most of its length.

As can be seen in Figure D a brake cable opening is provided through the stem portion 114. This permits a user to pass a brake cable that is thread from the brake levers, typically at the handholds 120 and through the interior of the aerodynamically-shaped left and right portions 118 to run downwardly directly to the brake caliper. This prevents a longer cable run keeping a greater portion of the cable out of the wind potentially reducing drag on the associated bicycle during use.

The extension shaft 104 is independently illustrated in FIG. 6A-C. The shaft is typically fabricated from a carbon/epoxy composite material with threaded inserts 127 either molded into or adhesively secured into the top end 128 to facilitate attachment to the elbow rest platform 108. The shaft, which is typically primarily tubular, can be made from other materials as well, such as an aluminum alloy. As can be seen in FIG. 6A, the top end of the extension is concave. The concave top surface is configured to mate with a convex portion 130 on the bottom side of the elbow rest platform. By tightening or loosening a pair of spaced fasteners 132 (or securing bolts), the relative angle of the platform can be varied relative to the extension and the main body 102 much in the same way the angle of a saddle relative to the bike is varied by certain types of seatposts. The angle is typically infinitely adjustable within a range, which typically comprises but is not limited to a total of about 30 degrees forward and back. A convex doubled-holed washer 133 is provided to ensure the heads of the fasteners 132 are fully seated regardless of the tilt of the elbow rest platform 108.

The components of the elbow rest subassembly 106 are also best seen in FIGS. 6A-C. The elbow rest platform 108 is the component that all the other components of the subassembly are attached. It is typically comprised of carbon fiber/epoxy composite but can comprise other suitable rigid materials including aluminum alloys. As indicated above, it is also through the elbow rest platform that the subassembly attaches to the extension shaft 104 by way of the convex portion 130 provided on its bottom side and a pair of spaced fastener bores (not seen in the figures).

Figure 9:
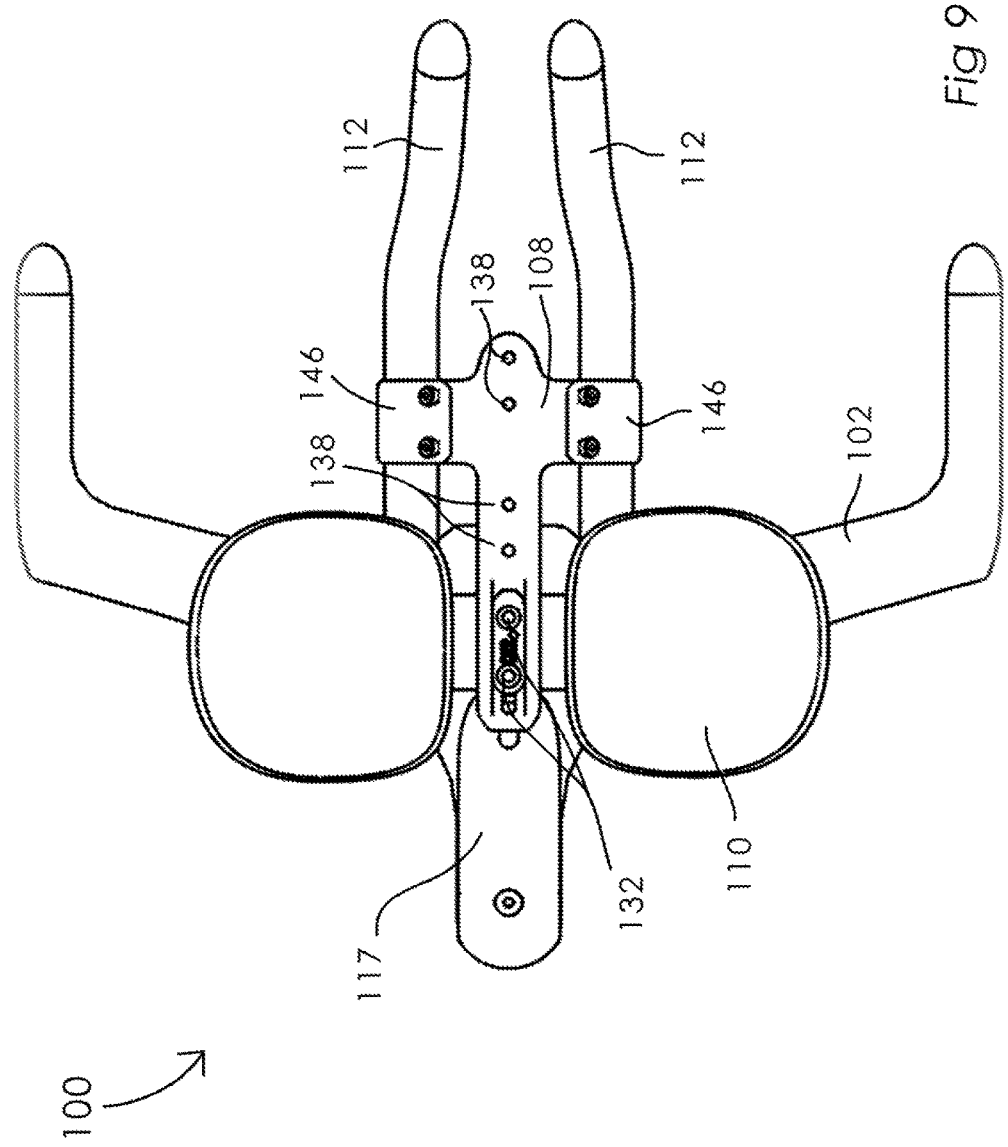
FIG. 9 is a top view of the handlebar and stem assembly according to one embodiment of the present invention.
Figure 10:
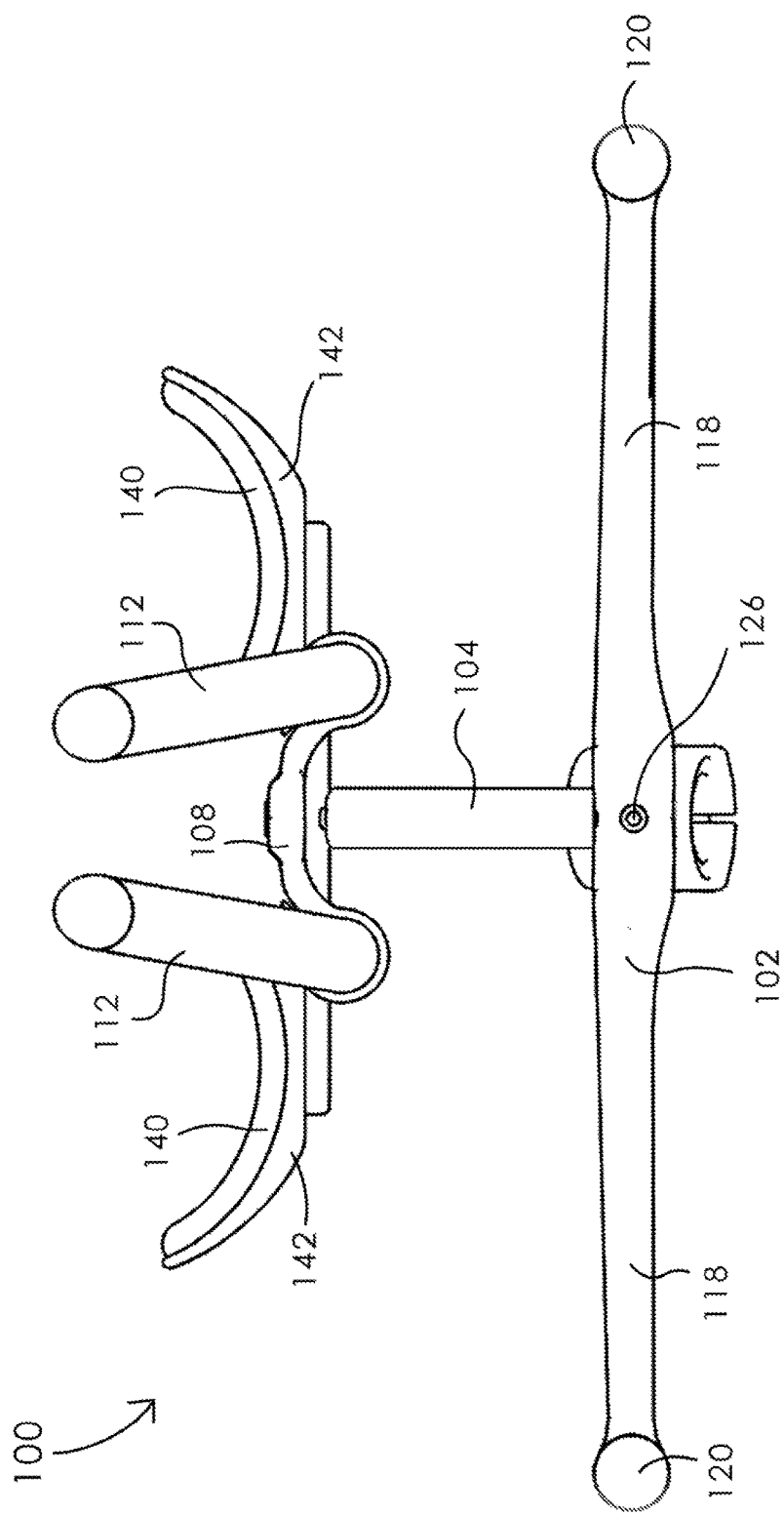
FIG. 10 is a front view of the handlebar and stem assembly according to one embodiment of the present invention.
Figure 11:
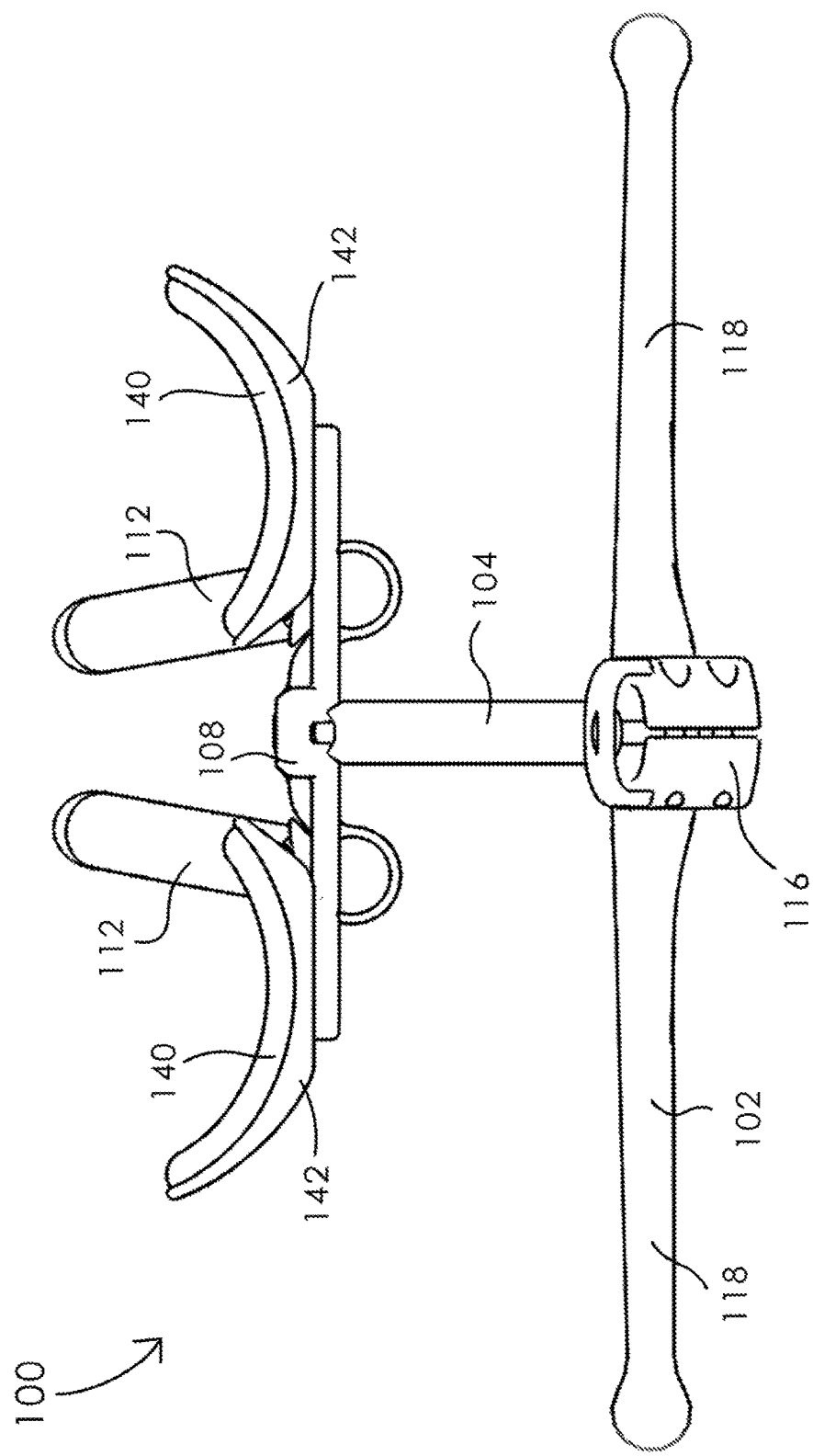
FIG. 11 is a rear view of the handlebar and stem assembly according to one embodiment of the present invention.

As can be best seen in FIGS. 7 and 9 among others, several sets or grids of threaded and unthreaded fastener openings 136 & 138 are provided in the elbow rest platform 108 to facilitate the attachment and positional adjustment of the elbow pads 110 and to facilitate the attachment of a water bottle holder as desired.

The elbow pads 110 each comprise an elastomer and/or foam pad mounted on a elbow pad base 142. The base is typically comprised of a rigid material such as a plastic, carbon fiber composite or metal. As best seen in FIG. 7, an array of holes 144 are provided through which fasteners can be received to secure the elbow pad to the elbow rest platform 108 through threaded openings 136 in the platform. This configuration give the user great flexibility in the positioning of the elbow pads relative to the rest of the elbow pad assembly.

The elbow rest platform 108 also includes a pair of spaced tube clamp portions 146 into which each of the pair of extension rods 112 is received. The position of each extension rod, typically include one or more bends, is adjustable as desired by a particular user. The extension rods are most typically tubular and comprised of a carbon fiber composite or metal.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention. For instance, the exact design and configuration of the apparatus can vary dramatically from the illustrated embodiment utilizing different materials and mechanisms as best adapted for the materials and construction of the apparatus.

U.S. Pat. No. 9,415,825 entitled Combination Bicycle Handlebar And Stem Assembly issued on Aug. 16, 2016 and having the same inventor is incorporated herein by reference.

I claim:

1. A handlebar and stem assembly comprising:
    a body member including
        a stem portion adapted to be attached to a fork of a bicycle,
        a left portion extending outwardly from a left side of the stem portion and terminating in a left handhold,
        a right portion extending outwardly from a right side of the stem portion and terminating in a right handhold, and
        a shaft opening extending generally vertically through a top surface and a bottom surface of the body member;
    an extension shaft including a top end, the extension shaft being slidably received in the shaft opening and securable to the body member in at least a plurality of positions along a length of the shaft;
    an elbow rest assembly including
        left and right elbow pads,
        left and right extension rods, and
        an elbow rest platform with the left and right elbow pads and the left and right extension rods being secured to the elbow rest platform, the elbow rest platform including a bottom side and the elbow rest platform being secured to the top end of the extension shaft at the bottom side
    wherein the elbow rest platform is tiltably secured to the top end of the extension shaft permitting the angle of the elbow rest platform to be adjusted relative to the shaft.

2. The handlebar assembly of claim 1, wherein the extension shaft is tubular.

3. The handlebar assembly of claim 1, wherein the at least a plurality of positions of the extension shaft is infinitely adjustable along the length.

4. The handlebar assembly of claim 1, wherein the body member is unitarily constructed and comprises a carbon fiber composite material.

5. The handlebar assembly of claim 1, wherein the extension shaft and the elbow rest platform are constructed of carbon fiber composite material.

6. The handlebar assembly of claim 1, wherein the top end of the extension shaft is one of concave and convex, and the bottom side of the elbow rest platform includes a portion that is concave or convex to operatively join with the top end.

7. The handlebar assembly of claim 1, wherein the top end of the extension shaft is concave and a portion of the bottom side of the elbow rest platform is convex, and wherein the convex portion is matingly received against the top end.

8. The handlebar assembly of claim 7 further comprising one or more elbow rest platform securing bolt wherein (i) the top end of the extension shaft includes at least one threaded bore, (ii) the elbow rest platform includes at least one bolt bore passing through the convex portion and (iii) the at least one elbow rest platform securing bolt is received through the at least one bore and threaded into the at least one threaded bore.

9. The handlebar assembly of claim 1, wherein each of the left and right elbow pads have an array of holes arranged thereon with at least two securing fasteners received through a pair of the holes of the array thereby securing the right and left elbow pads to the elbow rest platform, the array of holes of each elbow pad permitting the position of elbow pad relative to the elbow rest platform to be varied depending on the proclivities of a user by choosing a different pair of holes of the array of holes.

10. The handlebar assembly of claim 1, wherein the left and right extension rods are secured to the elbow rest platform by respective left and right tubular clamps, the tubular clamps being integral to the elbow rest platform.

11. A handlebar and stem assembly comprising:
    a body member including
        a stem portion adapted to be attached to a fork of a bicycle,
        a left portion extending outwardly from a left side of the stem portion and terminating in a left handhold,
        a right portion extending outwardly from a right side of the stem portion and terminating in a right handhold, and
        a shaft opening extending generally vertically through a top surface and a bottom surface of the body member;
    an extension shaft including a top end, the extension shaft being slidably received in the shaft opening and securable to the body member in at least a plurality of positions along a length of the shaft;
    a wedge and a grub screw, wherein (i) the grub screw and wedge are received in the body member and (ii) the wedge is forced against the extension shaft in the shaft opening when the grub screw is tightened; and
    an elbow rest assembly including
        left and right elbow pads,
        left and right extension rods, and
        an elbow rest platform with the left and right elbow pads and the left and right extension rods being secured to the platform, the elbow rest platform including a bottom side and the elbow rest platform being secured to the top end of the extension shaft at the bottom side.

12. The handlebar assembly of claim 11, wherein the elbow rest platform is tiltably secured to the top end of the extension shaft permitting the angle of the elbow rest platform to be adjusted relative to the shaft.

13. The handlebar assembly of claim 11, wherein the at least a plurality of positions of the extension shaft is infinitely adjustable along the length.

14. The handlebar assembly of claim 11, wherein the at least a plurality of positions of the extension shaft is infinitely adjustable along the length.

15. The handlebar assembly of claim 11, wherein the body member is unitarily constructed and comprises a carbon fiber composite material.

16. A handlebar and stem assembly comprising:
   a body member including
      a stem portion adapted to be attached to a fork of a bicycle,
      a left portion extending outwardly from a left side of the stem portion and terminating in a left handhold,
      a right portion extending outwardly from a right side of the stem portion and terminating in a right handhold, and
      a shaft opening extending generally vertically through a top surface and a bottom surface of the body member;
   an elongated tubular shaft including a top end, the extension shaft being slidably received in the shaft opening and securable to the body member at any position along a length of the shaft;
   an elbow rest assembly including
      left and right elbow pads,
      left and right extension rods, and
      an elbow rest platform with the left and right elbow pads and the left and right extension rods being secured to the platform, the elbow rest platform including a bottom side and the elbow rest platform being secured to the top end of the extension shaft at the bottom side; and
   wherein the elbow rest platform is tiltably secured to the top end of the extension shaft permitting the angle of the elbow rest platform to be adjusted relative to the shaft.

17. The handlebar assembly of claim 16 further comprising a wedge and a grub screw, wherein (i) the grub screw and wedge are received in the body member and (ii) the wedge is forced against the extension shaft in the shaft opening when the grub screw is tightened.

18. The handlebar assembly of claim 16, wherein the body member, the elbow rest pad platform and the elongated tubular shaft comprise carbon fiber composite material.

19. The handlebar assembly of claim 16, wherein the top end of the extension shaft is concave and a portion of the bottom side of the elbow rest platform is convex, and wherein the convex portion is matingly received against the top end.

20. The handlebar assembly of claim 16 further comprising one or more elbow rest platform securing bolt wherein (i) the top end of the extension shaft includes at least one threaded bore, (ii) the elbow rest platform includes at least one bolt bore passing through the convex portion and (iii) the at least one elbow rest platform securing bolt is received through the at least one bore and threaded into the at least one threaded bore.

\* \* \* \* \*

(12) EX PARTE REEXAMINATION CERTIFICATE (11709th)
United States Patent
Salazar

(10) Number: US 10,160,510 C1
(45) Certificate Issued: Aug. 5, 2020

(54) HEIGHT AND TILT ADJUSTABLE HANDLEBAR AND STEM ASSEMBLY

(71) Applicant: Nicholas M Salazar, Parker, CO (US)

(72) Inventor: Nicholas M Salazar, Parker, CO (US)

Reexamination Request:
No. 90/014,304, May 17, 2019

Reexamination Certificate for:
Patent No.: 10,160,510
Issued: Dec. 25, 2018
Appl. No.: 15/708,409
Filed: Sep. 19, 2017

(51) Int. Cl.
*B62K 21/12* (2006.01)
*B62K 21/14* (2006.01)
*B62K 21/16* (2006.01)

(52) U.S. Cl.
CPC ............ *B62K 21/12* (2013.01); *B62K 21/125* (2013.01); *B62K 21/14* (2013.01); *B62K 21/16* (2013.01)

(58) Field of Classification Search
None
See application file for complete search history.

(56) References Cited

To view the complete listing of prior art documents cited during the proceeding for Reexamination Control Number 90/014,304, please refer to the USPTO's public Patent Application Information Retrieval (PAIR) system under the Display References tab.

*Primary Examiner* — Terrence R Till

(57) ABSTRACT

A combination triathlon aero handlebar and stem assembly or handlebar assembly is described that permits the adjustment of the height and tilt of the elbow platform and the associated left and right tubular hand extensions relative to a main body thereof.

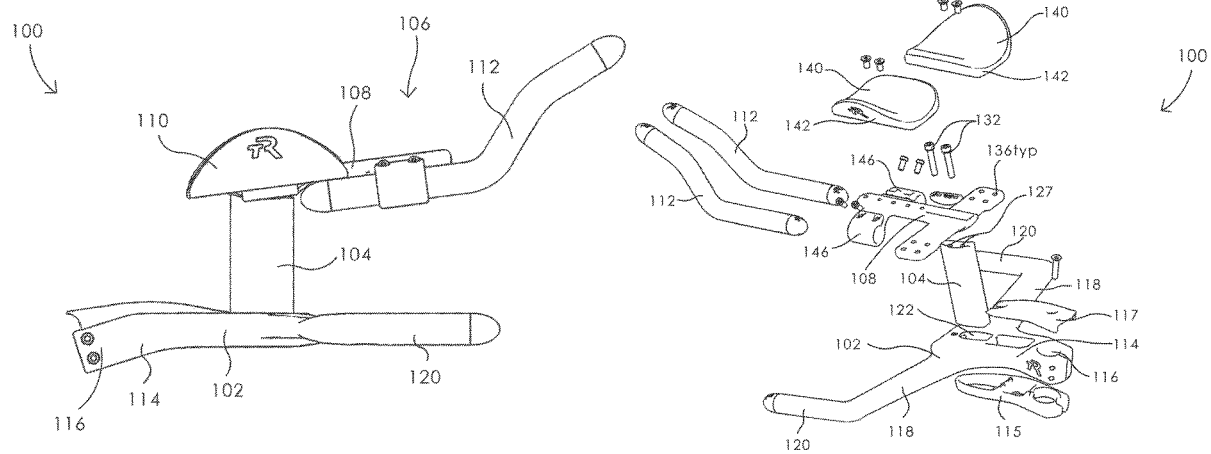

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 2, line 28-column 2, line 38:
Embodiments of the handlebar assembly include a generally vertically-orientated, aerodynamically-shaped extension shaft, which the elbow platform assembly is attached at a top end, that is *orthogonally and* slidably received in a correspondingly-shaped opening in the main body of the integral stem and handlebar. The extension shaft is securable by way of a wedge clamp actuated from a single cap *grub* screw typically from the front of the main body. This configuration facilitates infinite height adjustment of the shaft along its length allowing a user to place the height of the elbow rest assembly wherever he/she desires.

Column 3, line 64-column 4, line 16:
As can be seen in FIGS. 6B-D, an airfoil-shaped shaft opening 122 is provided through the left/right center of the main body 102 proximate the fore and aft location where the left and right portions 118 extend outwardly. At a front end of the opening with primary reference to FIG. 6D, a correspondingly shaped wedge 124 is provided that is configured to be pushed into the opening by a grub screw 126 when the grub screw is tightened. A set screw 125 can also be provided that prevents the wedge from falling out of the body when the extension shaft is removed from the shaft opening 122. The shaft opening is configured to slidably receive the aerodynamically-shaped (or aerofoil) extension shaft 104 therethrough *orthogonally relative to the main body*. By tightening the grub screw, which is typically accessed at the front face of the body, a user can secure the post in place at a desired height. FIG. 2 illustrates the extension shaft fully extended and FIG. 3 illustrates the extension shaft in an almost fully lowered position. It is to be appreciated that the positioning of the extension shaft is infinitely variable or adjustable within along most of its length.

Column 4, line 17-column 4, line 26:
As can be seen in FIG. [D] *6D* a brake cable opening *13* is provided through the stem portion 114. This permits a user to pass a brake cable that is thread from the brake levers, typically at the handholds 120 and through the interior of the aerodynamically-shaped left and right portions 118 to run downwardly directly to the brake caliper. This prevents a longer cable run keeping a greater portion of the cable out of the wind potentially reducing drag on the associated bicycle during use.

Column 4, line 62-column 5, line 4:
The elbow pads 110 each comprise an elastomer and/or foam pad *140* mounted on a elbow pad base *142*. The base is typically comprised of a rigid material such as a plastic, carbon fiber composite or metal. As best seen in FIG. 7, an array of holes 144 are provided through which fasteners can be received to secure the elbow pad to the elbow rest platform 108 through threaded openings 136 in the platform. This configuration give the user great flexibility in the positioning of the elbow pads relative to the rest of the elbow pad assembly.

AS A RESULT OF REEXAMINATION, IT HAS BEEN DETERMINED THAT:

Claims 6, 7, 17 and 19 are cancelled.
Claims 1, 8, 11 and 16 are determined to be patentable as amended.
Claims 2-5, 9, 10, 12-15, 18 and 20, dependent on an amended claim, are determined to be patentable.
New claims 21 and 22 are added and determined to be patentable.

1. A handlebar and stem assembly comprising:
a body member including
a stem portion adapted to be attached to a fork of a bicycle,
a left portion extending outwardly from a left side of the stem portion and terminating in a left handhold,
a right portion extending outwardly from a right side of the stem portion and terminating in a right handhold, and
a shaft opening extending generally vertically *and orthogonally* through a top surface and a bottom surface of the body member;
an extension shaft including a *concave* top end, the extension shaft being slidably received in the shaft opening and securable to the body member in at least a plurality of positions along a length of the shaft;
an elbow rest assembly including
left and right elbow pads,
left and right extension rods, and
an elbow rest platform with the left and right elbow pads and the left and right extension rods being secured to the elbow rest platform, the elbow rest platform including a *convex* bottom side and the elbow rest platform being secured to the top end of the extension shaft at the bottom side
wherein the elbow rest platform is tiltably secured to the top end of the extension shaft permitting the angle of the elbow rest platform to be adjusted relative to the shaft.

8. The handlebar assembly of claim [7] *1* further comprising one or more elbow rest platform securing bolt wherein (i) the top end of the extension shaft includes at least one threaded bore, (ii) the elbow rest platform includes at least one bolt bore passing through the convex [portion] *bottom side* and (iii) the at least one elbow rest platform securing bolt is received through the at least one bore and threaded into the at least one threaded bore.

11. A handlebar and stem assembly comprising:
a body member including
a stem portion adapted to be attached to a fork of a bicycle,
a left portion extending outwardly from a left side of the stem portion and terminating in a left handhold,
a right portion extending outwardly from a right side of the stem portion and terminating in a right handhold, and a shaft opening extending generally vertically *and orthogonally* through a top surface and a bottom surface of the body member;

an extension shaft including a *concave* top end, the extension shaft being slidably received in the shaft opening and securable to the body member in at least a plurality of positions along a length of the shaft;

a wedge and a grub screw, wherein (i) the grub screw and wedge are received *in a cavity at a front of the body member* and (ii) the wedge is forced *substantially horizontally* against the extension shaft in the shaft opening when the grub screw is tightened; and an elbow rest assembly including
    left and right elbow pads,
    left and right extension rods, and
    an elbow rest platform with the left and right elbow pads and the left and right extension rods being secured to the platform, the elbow rest platform including a *convex* bottom side and the elbow rest platform being secured to the top end of the extension shaft at the bottom side.

16. A handlebar and stem assembly comprising:
a body member including
    a stem portion adapted to be attached to a fork of a bicycle,
    a left portion extending outwardly from a left side of the stem portion and terminating in a left handhold,
    a right portion extending outwardly from a right side of the stem portion and terminating in a right handhold, and
    a shaft opening extending generally vertically *and orthogonally* through a top surface and a bottom surface of the body member;

an elongated tubular shaft including a *concave* top end, the extension shaft being slidably received in the shaft opening and securable to the body member at any position along a length of the shaft;

a wedge, a grub screw and a set screw, wherein (i) *the grub screw and wedge are received in a cavity at a front of the body member and accessible at a front edge of the body member,* (ii) *the wedge is forced substantially horizontally against the extension shaft in the shaft opening when the grub screw is tightened, and* (iii) *a set screw, the set screw being received into the wedge through the body member, the set screw configured to prevent the wedge from falling out of the body member when the extension shaft is removed from the body member;* an elbow rest assembly including
    left and right elbow pads,
    left and right extension rods, and
    an elbow rest platform with the left and right elbow pads and the left and right extension rods being secured to the platform, the elbow rest platform including a bottom side and the elbow rest platform being secured to the top end of the extension shaft at the bottom side; and wherein the elbow rest platform is tiltably secured to the *concave* top end of the extension shaft permitting the angle of the elbow rest platform to be adjusted relative to the shaft.

*21. The handlebar assembly of claim 11, further including a set screw, the set screw being received into the wedge through the body member, the set screw configured to prevent the wedge from falling out of the body member when the extension shaft is removed from the body member.*

*22. The handlebar assembly of claim 11, wherein the grub screw is accessible at a front edge of the body member.*

* * * * *